(12) United States Patent
Akiyama et al.

(10) Patent No.: US 8,478,759 B2
(45) Date of Patent: Jul. 2, 2013

(54) INFORMATION PRESENTATION APPARATUS AND MOBILE TERMINAL

(75) Inventors: Takayuki Akiyama, Kokubunji (JP); Masaaki Tanizaki, Nishitokyo (JP); Kiyohiro Obara, Hachioji (JP); Takashi Onoyama, Tokyo (JP); Noriyuki Yamasaki, Tokyo (JP); Takashi Hashimoto, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 232 days.

(21) Appl. No.: 12/913,011

(22) Filed: Oct. 27, 2010

(65) Prior Publication Data

US 2011/0106809 A1    May 5, 2011

(30) Foreign Application Priority Data

Oct. 30, 2009  (JP) .................................. 2009-250274

(51) Int. Cl.
*G06F 17/30*  (2006.01)
(52) U.S. Cl.
USPC ............ 707/740; 707/708; 707/748; 707/751

(58) Field of Classification Search
USPC .................................. 707/740, 708, 748, 751
See application file for complete search history.

(56) References Cited

U.S. PATENT DOCUMENTS

| 2004/0073493 | A1 | 4/2004 | Kato et al. |
| 2006/0015912 | A1 | 1/2006 | Itabashi |
| 2008/0275868 | A1* | 11/2008 | Zer .................................. 707/5 |
| 2010/0030645 | A1* | 2/2010 | Watanuki et al. ........... 705/14.53 |
| 2010/0071005 | A1* | 3/2010 | Kusunoki ......................... 725/46 |
| 2010/0211638 | A1* | 8/2010 | Rougier ......................... 709/205 |

FOREIGN PATENT DOCUMENTS

| JP | 2006-31441 A | 2/2006 |
| JP | 2007-115220 A | 5/2007 |
| WO | 03/021943 A1 | 3/2003 |

* cited by examiner

*Primary Examiner* — Cindy Nguyen
(74) *Attorney, Agent, or Firm* — Mattingly & Malur, PC

(57) ABSTRACT

Information in which a user is interested when viewing a program and a situation and a behavior of the user are to be associated with each other. A keyword dictionary defining program information and a user behavior model are provided, and thereby the scene interesting the user is registered and stored, and information on the interesting scene is presented in a situation optimal to the user.

14 Claims, 17 Drawing Sheets

FIG. 2

| Program name | Scene ID | Schedule | Performer | Genre | Content description | Program time length |
|---|---|---|---|---|---|---|
| Program P | ID_P1 | Opening | C_1 | G_1 | ~ | $Lp_1$ |
| Program P | ID_P2 | Session 1 | C_2 | G_1 | ~ | $Lp_2$ |
| Program P | ID_P3 | Session 2 | C_3 | G_1 | ~ | $Lp_3$ |
| Program P | ID_P4 | Ending | C_4 | G_1 | ~ | $Lp_4$ |
| ... | ... | ... | ... | ... | ... | ... |

FIG. 3

| Scene ID | Starting time of viewing | Finishing time of viewing | Button pressing time |
|---|---|---|---|
| ID_P1 | AA:AA:AA | DD:DD:DD | 0 |
| ID_Q3 | BB:BB:BB | EE:EE:EE | GG:GG:GG |
| ID_R2 | CC:CC:CC | FF:FF:FF | HH:HH:HH |
| ... | ... | ... | ... |

FIG. 4

| Keyword | Category |
|---|---|
| KW_1 | Person |
| KW_2 | Location |
| KW_3 | Restaurant |
| KW_4 | Costume |
| KW_5 | Book |
| KW_6 | Bookstore |
| ... | ... |

| Location | Latitude | Longitude |
|---|---|---|
| PL_1 | VV | XX |
| PL_2 | YY | ZZ |
| ... | ... | ... |

FIG. 5

| Scene ID | Person | Location | Costume | Restaurant | ... | Interesting time | Registration date |
|---|---|---|---|---|---|---|---|
| ID_Q3 | C_2 | PL_2 | F | 0 | ... | $T_1$ | YY/YY |
| ID_R2 | C_3 | PL_3 | 0 | 0 | ... | $T_2$ | ZZ/ZZ |
| ... | ... | ... | ... | ... | ... | ... | ... |

FIG. 9

| Behavior | Probability of category wanted by user (%) | | | |
|---|---|---|---|---|
| | Location | Costume | Restaurant | ... |
| A1 | 20 | 40 | 30 | ... |
| A2 | 10 | 75 | 15 | ... |
| A3 | 0 | 10 | 65 | ... |
| ... | ... | ... | ... | ... |

| input | Behavior |
|---|---|
| 1 and 2 | A1 |
| 3 and 5 | A2 |
| ... | ... |

FIG. 10A

| Behavior | Probability of category wanted by user (%) | | | | | | | |
|---|---|---|---|---|---|---|---|---|
| | Location | Costume | Restaurant | Tourist site | Person | Bookstore | Movie | ... |
| Travel | 20 | 0 | 20 | 40 | 20 | 0 | 0 | ... |
| Homecoming | 5 | 5 | 5 | 0 | 25 | 35 | 25 | ... |
| ... | ... | ... | ... | ... | ... | ... | ... | ... |

FIG. 10B

| Scene ID | Person | Location | Costume | Restaurant | Tourist site | Bookstore | Movie | ... | Interesting time | Registration date |
|---|---|---|---|---|---|---|---|---|---|---|
| ID_P2 | 0 | Hiroshima | 0 | 0 | Atomic bomb museum | 0 | 0 | ... | $T_1$ | Y1/D1 |
| ID_Q5 | C_3 | Hiroshima | 0 | Okonomiyaki parlor | 0 | 0 | 0 | ... | $T_2$ | Y2/D2 |
| ID_R3 | 0 | Hiroshima | 0 | Okonomiyaki parlor | 0 | 0 | 0 | ... | $T_3$ | Y3/D3 |
| ID_S4 | 0 | 0 | 0 | 0 | 0 | Syayo (The setting sun) | 0 | ... | $T_4$ | Y4/D4 |
| ID_T1 | C_7 | 0 | 0 | 0 | 0 | 0 | Shine | ... | $T_5$ | Y5/D5 |
| ID_U2 | C_9 | Kokubunji | 0 | Cafe | 0 | 0 | 0 | ... | $T_6$ | Y6/D6 |
| ... | ... | ... | ... | ... | ... | ... | ... | ... | ... | ... |

| Scene ID | Performer | Genre | Keyword | Interesting time | Registration date |
|---|---|---|---|---|---|
| ID_P1 | C_1 | G_1 | KW_1, KW_2, KW_3 | $T_1$ | XX/XX |
| ID_Q3 | C_2 | G_1 | KW_4 | $T_2$ | YY/YY |
| ... | ... | ... | ... | ... | ... |

Extract correlation of keywords from keywords and description text, and perform clustering

FIG. 13

| Keyword | Category |
|---|---|
| KW_1 | X1 |
| KW_2 | X2 |
| KW_3 | X3 |
| KW_4 | X4 |
| KW_5 | X5 |
| KW_6 | X6 |
| KW_7 | X1 |
| KW_8 | X3 |
| KW_9 | X4 |
| ... | ... |

FIG. 14

| Scene ID | X1 | X2 | X3 | X4 | ... | Interesting time | Registration date |
|---|---|---|---|---|---|---|---|
| ID_P1 | A | 0 | P | 0 | ... | $T_1$ | XX/XX |
| ID_Q3 | B | H | 0 | 0 | ... | $T_2$ | YY/YY |
| ID_R2 | C | 0 | 0 | U | ... | $T_3$ | ZZ/ZZ |
| ... | ... | ... | ... | ... | ... | ... | ... |

| input | 1 | 2 | ... |
|---|---|---|---|
| 1 | V11 | V12 | ... |
| 2 | V21 | V22 | ... |
| ... | ... | ... | ... |

GPS moving trajectory
Purchase of article
Email operation
Web browsing, etc.

| input | Behavior |
|---|---|
| 1 and 2 | A1 |
| 3 and 5 | A2 |
| ... | ... |

| Behavior | Probability of category wanted by user (%) | | | |
|---|---|---|---|---|
| | X1 | X2 | X3 | ... |
| A1 | 20 | 40 | 30 | ... |
| A2 | 10 | 75 | 15 | ... |
| ... | ... | ... | ... | ... |

Randomly apply cluster of keywords to attribute, add correct and incorrect answers by user input, and apply correct cluster

FIG. 18A

| input | Behavior |
|---|---|
| 1 and 2 | A1 |
| "Web browsing" and "Kokubunji station" | Killing time |
| ... | ... |

| Keyword | Category |
|---|---|
| KW_1 | X1 |
| Bowling | Amusement |
| KW_3 | X3 |
| KW_4 | X4 |
| Billiards | Amusement |
| KW_6 | X6 |
| ... | ... |

FIG. 18B

| Behavior | Probability of category wanted by user (%) | | | |
|---|---|---|---|---|
| | X1 | Amusement | X3 | ... |
| A1 | 20 | 40 | 30 | ... |
| Killing time | 10 | 75 | 15 | ... |
| ... | ... | ... | ... | ... |

FIG. 20

| Keyword | Category | Behavior |
|---------|----------|----------|
| KW_1 | X1 | A1 |
| KW_2 | X2 | A2 |
| KW_3 | X3 | A3 |
| KW_4 | X4 | A4 |
| KW_5 | X5 | A5 |
| KW_6 | X6 | A6 |
| KW_7 | X2 | A1 |
| KW_8 | X5 | A2 |
| KW_9 | X3 | A3 |
| KW_10 | X4 | A4 |
| KW_11 | X7 | A5 |
| KW_12 | X6 | A6 |
| ... | ... | ... |

INFORMATION PRESENTATION APPARATUS AND MOBILE TERMINAL

CLAIM OF PRIORITY

The present application claims priority from Japanese patent application JP 2009-250274 filed on Oct. 30, 2009, the content of which is hereby incorporated by reference into this application.

BACKGROUND OF THE INVENTION

1. Field of the Invention

The present invention relates to an apparatus that recommends a program suitable for a user preference to a user.

2. Background Art

In the modern information civilization society, the amount of information provided by various media such as broadcast programs and the Internet is immeasurable. In particular, the influence of television on viewers is great. The ownership rate of televisions is extremely high. Televisions are installed in almost all households. Broadcast content distributed from each broadcasting station is viewed by an unspecified large number of people. In such situations, when a user views a program, the user is interested not only in commercials and program content but also in information related to the program, for example, information on costumes of performers and information on locations.

Recently, development of digital technologies enables a large volume of information related to image content and programs to be stored. Further, HDD (Hard Disk Drive)-based recorders, personal computers having functions of recording and viewing television programs and the like have appeared. Accordingly, techniques that allow a user to register and store information on an interesting scene when viewing a program and then present the information to the user after viewing have actively been researched.

WO2003/021943 discloses a technique where a user designates an article by voice at a scene in which the article that the user wants to purchase appears when viewing a program and then the user accesses article registration information and receives detailed information on the article, which the user wants to purchase, after viewing the program. JP Patent Publication (Kokai) No. 2006-031441 A discloses a technique that utilizes a broadcast program, such as a program on travels, and information on the Internet corresponding to the broadcast program and registers the program and the information along with location information and thereby generates navigation data suiting interest and preference of a user. JP Patent Publication (Kokai) No. 2007-115220A discloses a technique where an article that a user is required to remember is preliminarily registered on a mobile terminal and then selection of a registered article memo list allows connection to a store terminal, thereby enabling detailed information to be acquired. Further, when the user approaches the store terminal, a notification screen of the article in the store is displayed from the memo list recorded in the mobile terminal.

The method of WO2003/021943 has a problem that the user forgets that he/she is interested after viewing the program and does not perform search behavior and the like. Accordingly, a technique is required that presents information having been registered according to the interest of the user in a situation optimal to the user. There is a problem that, if information is presented to the user from the preliminarily created information as with JP Patent Publication (Kokai) No. 2006-031441 A, the presented information is not necessarily information required by the user in the situation. Accordingly, a technique is required that presents an appropriate piece of information from the information having preliminarily interested the user.

SUMMARY OF THE INVENTION

The present invention presents information on a scene having interested a user among previously viewed programs in a situation optimal to the user.

Concerning presentation of interesting scene information related to every scene interesting the user when the user has viewed the program in the situation optimal to the user, it is incapable of presenting interesting scene information in the situation optimal to the user without defining a relationship between a keyword defining interesting scene information and a keyword defining the behavior of a user. For example, even if it is determined that the user wants to go to a "department store" according to analysis of behavior of the user, in a case where behavior of "going to a department store" is not associated with "costume" in the interesting scene information, the interesting scene information associated with the "costume" cannot be presented.

The present invention prepares a keyword dictionary, which defines program information, and a user behavior model, and thereby registers and stores the scene interesting the user and presents information of the scene interesting the user in a situation optimal to the user.

An information presentation apparatus according to the present invention includes: a program information database accumulating program information; a viewing history database accumulating a program viewing history of a user; a dictionary recording correspondence between a keyword and a category; an interesting scene extraction unit extracting a scene of a program that interests the user using the viewing history database and the program information database; an interesting scene registration unit that associates the interesting scene extracted by the interesting scene extraction unit and the keyword in the program information accompanying the interesting scene, and registers the keyword associating the interesting scene in an interesting scene registration information database according to the dictionary on a category-by-category basis; and an interesting scene presentation unit searching the interesting scene registration information database and retrieving and presenting the interesting scene matching with the input category, responsive to an input of information including the category from a mobile terminal.

A mobile terminal according to the present invention is used together with the information presentation apparatus, and includes: a user behavior model storing an input and probabilities for the respective categories corresponding to the input; a behavior analyzer that acquires probabilities for the respective categories corresponding to the latest input from the user behavior model, and transmits the probabilities to the information presentation apparatus; and a display unit displaying the interesting scene transmitted from the information presentation apparatus.

The present invention allows the user to acquire useful information recognized by the user when the user has viewed a program, again in the optimal situation.

BRIEF DESCRIPTION OF THE DRAWINGS

FIG. 2 is a diagram illustrating an example of a program information database.

FIG. 3 is a diagram illustrating an example of a viewing history database.

FIG. 4 is a diagram illustrating an example of a keyword dictionary.

FIG. 5 is a diagram illustrating an example of an interesting scene registration information database.

FIG. 9 is a diagram illustrating an example of a user behavior model.

FIGS. 10A and 10B are diagrams illustrating a specific example of the user behavior model and the interesting scene registration information database.

FIG. 13 is a diagram illustrating an example of the keyword dictionary generated by the clustering the keywords.

FIG. 14 is a diagram illustrating an interesting scene registration information database based on the keyword dictionary of FIG. 13.

FIGS. 18A and 18B are diagrams illustrating the keyword dictionary editor and the user behavior editor of FIG. 17.

FIG. 20 is a diagram illustrating an example of the ontology database.

DETAILED DESCRIPTION OF THE PREFERRED EMBODIMENTS

Embodiments of the present invention will hereinafter be described on the basis of the drawings.

[Embodiment 1]

Figure 1:
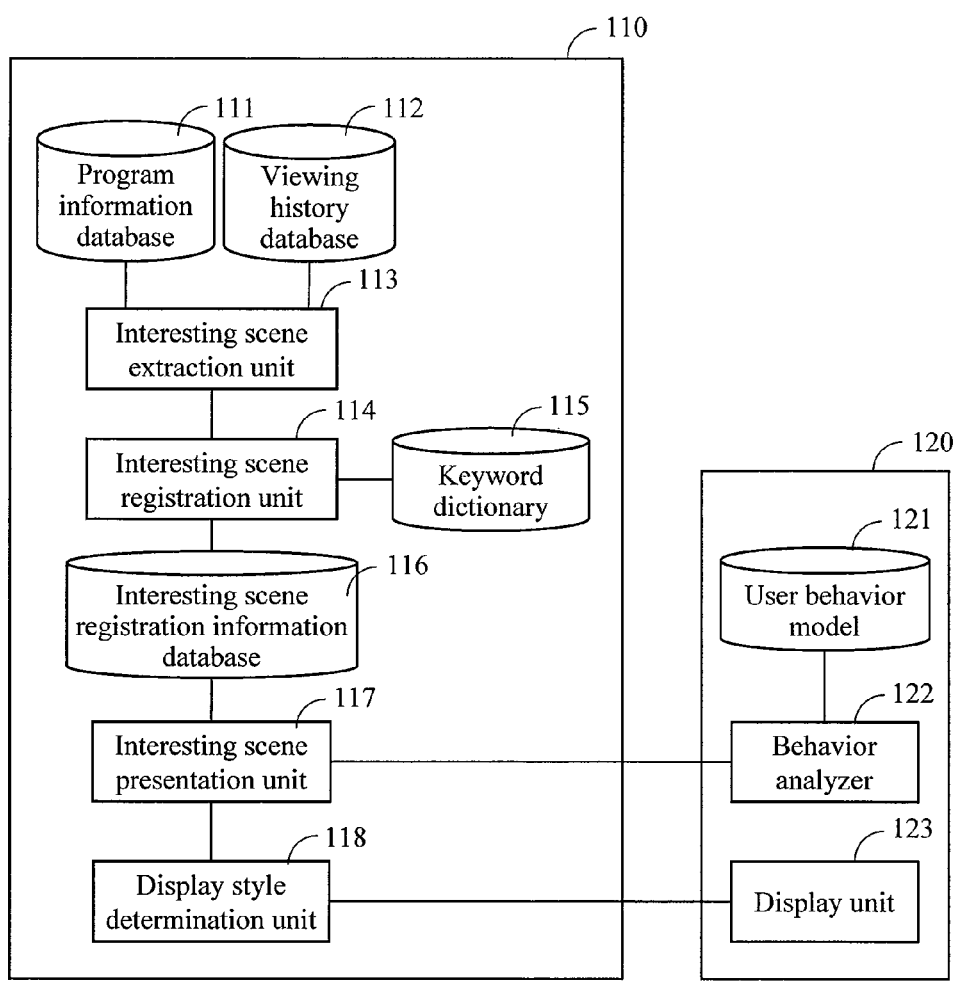
FIG. 1 is a diagram illustrating a configuration of an embodiment of the present invention.

FIG. 1 is a diagram showing an example of a configuration of an information presentation system according to the present invention.

A terminal 110 includes a program information database 111, a viewing history database 112, an interesting scene extraction unit 113, an interesting scene registration unit 114, a keyword dictionary 115, an interesting scene registration information database 116, an interesting scene presentation unit 117 and a display style determination unit 118. These elements can be built into an image content receiver such as, for example, a set-top box and a television. A terminal 120 includes a user behavior model 121, a behavior analyzer 122 and a display unit 123. These elements can be built into a mobile terminal such as, for example, a mobile phone, and in an information retrieval terminal such as a PC.

For example, an embedded database can be used for the program information database 111, the viewing history database 112, the keyword dictionary 115, the interesting scene registration information database 116 and the user behavior model 121. These databases are not necessarily controlled by the terminal. Instead, the databases may be controlled by a server or the like located at a place other than that of the terminal.

Elements configuring this embodiment will hereinafter be described.

The terminal 110 is a terminal having a function of viewing a program. An image content receiver, such as a set-top box and a television, can be applied thereto.

The program information database 111 manages program information such as, for example, an EPG (Electronic Program Guide) distributed from an image distribution server. FIG. 2 shows an example of a configuration of the program information database 111. The program information database 111 in the example of the figure includes items of a program name, a scene ID, a schedule, a performer, a genre, a content description and a program time length. The performer is stored with the names of a performer. The content description is stored with text describing program content.

The viewing history database 112 manages starting and finishing times of viewing by a user, and a time of inputting an "INTERESTED" button on a remote controller. The "INTERESTED" button is a button to be pressed by the user at an interesting scene. FIG. 3 shows an example of a configuration of the viewing history database 112. The viewing history database 112 includes items of a scene ID, a starting time of viewing, a finishing time of viewing and a button pressing time. In a case of the example of FIG. 3, it is recorded that the user had viewed a scene of a program P whose scene ID is ID_P1 from the time AA: AA: AA to the time DD: DD: DD and the "INTERESTED" button of the remote controller had not been pressed during the times. It is also recorded that the user had viewed a scene of a program Q whose scene ID is ID_Q3 from the time BB: BB: BB to the time EE: EE: EE and the "INTERESTED" button of the remote controller had been pressed on the time GG: GG: GG in the times. Not only the time of pressing the "INTERESTED" button of the remote controller but also the time of transmitting email and the time of web search at the mobile terminal may be recorded as times when the user interested in the scenes.

The interesting scene extraction unit 113 extracts the scene interesting the user from the program information and viewing histories managed by the program information database 111 and the viewing history database 112, respectively. More specifically, the interesting scene extraction unit 113 refers to the viewing history database 112 and extract the scene ID of a record where the button pressing time is written, and subsequently accesses the program information database 111 and extracts a keyword included in the items of the performer, the content description and the like of the record with the scene ID concerned.

The interesting scene registration unit 114 registers the keyword extracted by the interesting scene extraction unit 113 from the record with the interesting scene ID of the program information database 111 with respect to each category of the keyword defined by the keyword dictionary 115, and stores the keyword in the interesting scene registration information database 116. Words and phrases in a text not listed in the keyword dictionary are not used.

FIG. 4 shows an example of a configuration of the keyword dictionary 115. The keyword dictionary 115 includes keywords and categories corresponding thereto as items, and also holds a table including the names of locations and coordinates (latitude and longitude) corresponding thereto as items.

FIG. 5 shows an example of a configuration of the interesting scene registration information database 116. The interesting scene registration information database 116 includes the scene ID, a plurality of categories such as a "person" defined by the keyword dictionary 115, an interesting time and registration date as items. Here, the keyword belonging to the category is selected from among the keywords included in the record of the scene ID concerned and the selected keyword is stored in the item of the category. The interesting time indicates the time in the scene when the user is interested in the scene. The button pressing time in the viewing history database shown in FIG. 3 corresponds to the interesting time. The registration date indicates the date when the interesting scene was registered.

Here, the category indicates a meaning, such as a "person" and a "location", to which the keyword belongs, and is for classifying interests and behavioral objects of the user. The category may be defined by a service provider, automatically generated according to a behavior history of the user, or defined by a plurality of users. In Embodiment 1, the categories have already been defined. The case where the categories are automatically generated from the user behavior history will be described in detail in Embodiment 2. The case where the plurality of users define the categories will be described in Embodiment 3.

The interesting scene presentation unit 117 acquires information that is analyzed by a behavior analyzer 122, which will be described later, of the terminal 120 and is wanted by the user, and presents the interesting scene including the information wanted by the user from the interesting scene registration information database 116 to the display style determination unit 118.

The display style determination unit 118 performs a process of converting a format of image compression system and a display style according to the type of the terminal 120 displaying the interesting scene. It is supposed that the terminal 120 is a mobile terminal having a GPS function such as a mobile phone in this embodiment.

The user behavior model 121 is stored with operation content of the terminal 120, user behavior inferred from the operation content, and a probability to the item category to be sought next.

The user behavior analyzer 122 determines the category of the information wanted by the user from the operation history of the terminal 120 by means of the user behavior model 121, and transmits the category and the sought probability to the interesting scene presentation unit 117.

The display unit 123 is a screen, such as a display, for displaying information, and displays the information transmitted from the display style determination unit 118 of the terminal 110.

Figure 6:
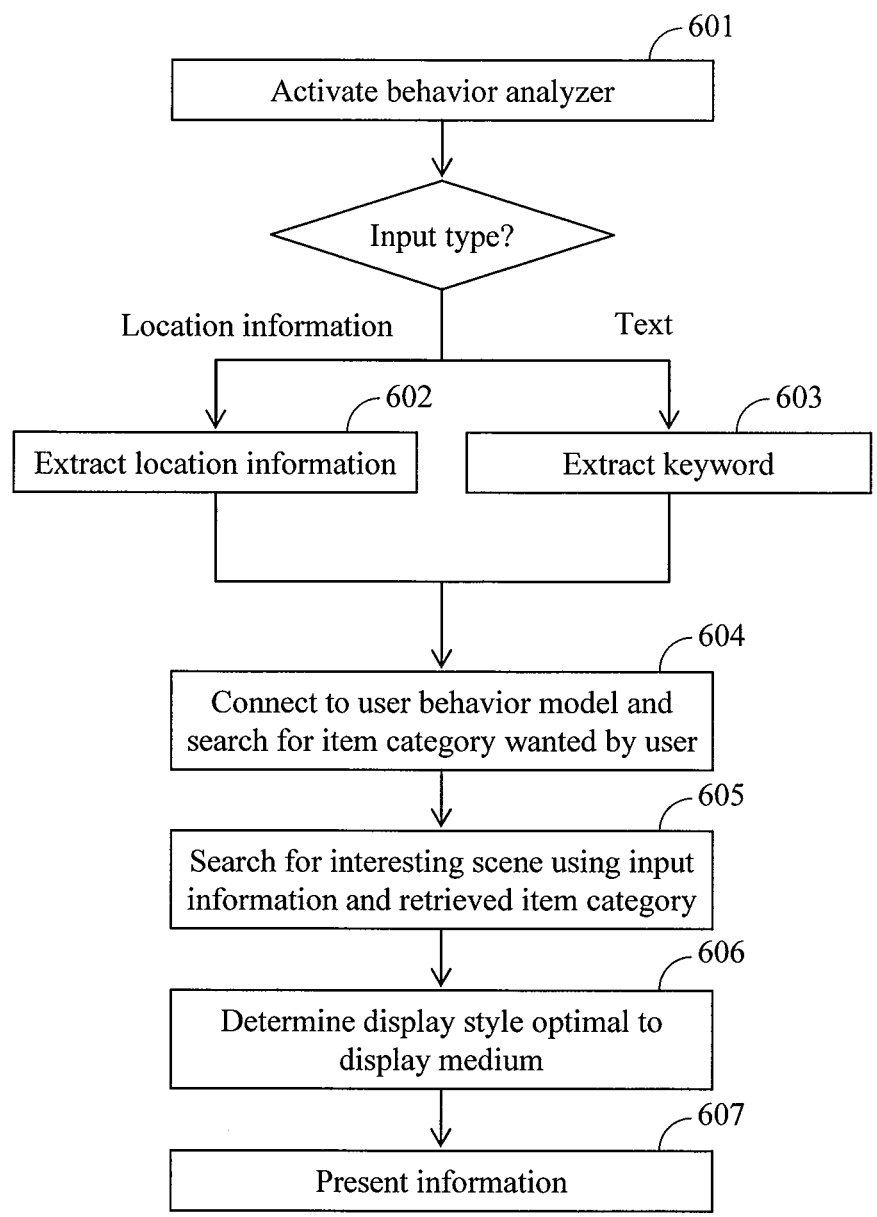
FIG. 6 is a diagram illustrating a flow of a process of an interesting scene presentation.
Figure 7:
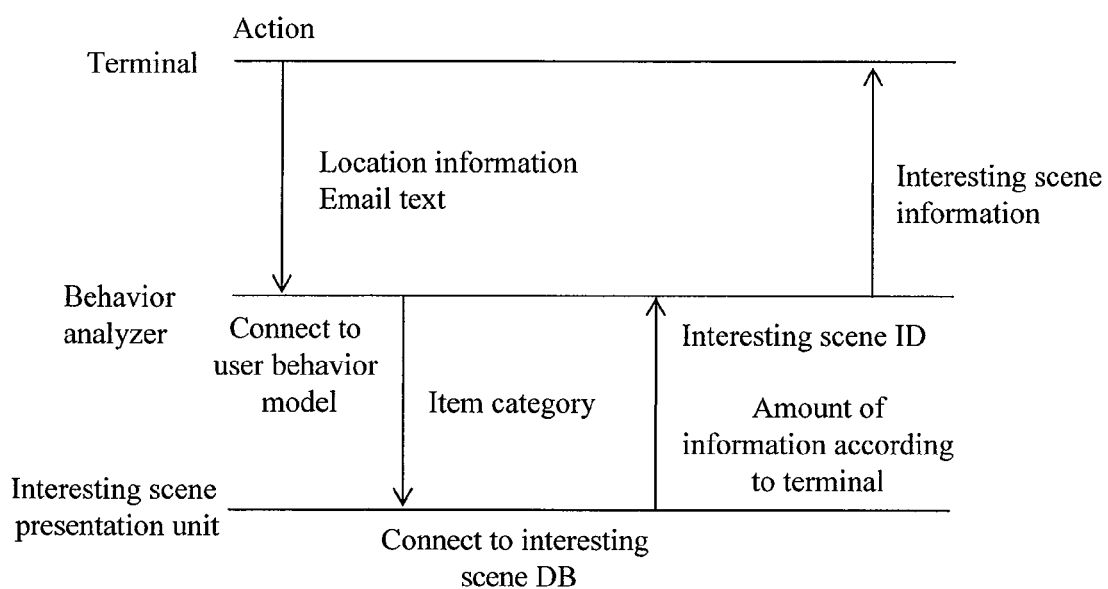
FIG. 7 is a diagram illustrating a flow of information of the interesting scene presentation.

FIG. 6 is a diagram showing a flow of a process from behavior analysis to interesting scene presentation of this embodiment. FIG. 7 is a diagram showing a flow of information in the process of FIG. 6.

In step 601, an operation via the mobile terminal is input, thereby activating the behavior analyzer 122. For example, this operation may be according to a press of a button, which is a button such as "INTERESTING SCENE PRESENTATION" button on the mobile terminal. Instead, the operation may be according to an input that is acquisition of location information by the GPS. Further, the operation may be specific behavior, as an input, such as passing through a ticket gate in a train station. Moreover, email transmission and reception, and a web search behavior may be regarded as inputs. It can be preset to the mobile terminal which timing of the operational input the behavior analyzer is activated.

If the input content is related to the location information, the present location information (latitude, longitude, etc.) is acquired in step 602. If the input content is related to characters such as email transmission and reception and web searches, a characteristic word is obtained in step 603. In step 604, connection is made to the user behavior model 121, and the item category wanted by the user and the probability are acquired. In step 605, both or any one of the retrieved item category and the location information is transmitted to the interesting scene presentation unit 117. The interesting scene presentation unit 117 searches the interesting scene from information database 116 for the interesting scene including the information. The search result is passed to the display style determination unit 118.

In step 606, the display style determination unit 118 determines a display style and a presentation style of the retrieved interesting scene. For example, the interesting scene information includes moving images and metadata of a text format. If a display apparatus is an apparatus such as a PC having a sufficient processing speed, displaying the entire information causes no problem. On the other hand, if the display apparatus is something like a mobile phone, displaying the entire information causes problems such as slow processing. Accordingly, displaying only text data and a moving image summary is practical. Thus, the display style determination unit 118 determines an appropriate display style according to the type and the like of the apparatus on which the interesting scene is to be displayed.

Figure 8A:
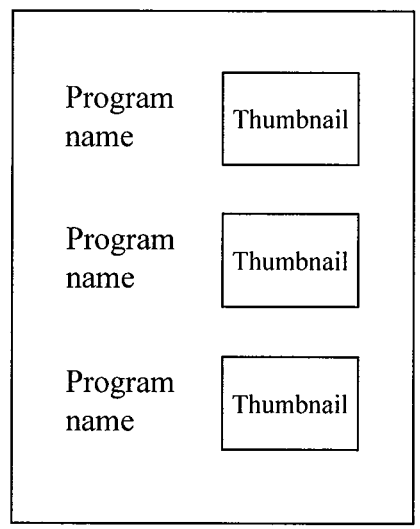
FIGS. 8A and 8B are diagrams illustrating display screens of interesting scenes on mobile terminals.
Figure 8B:
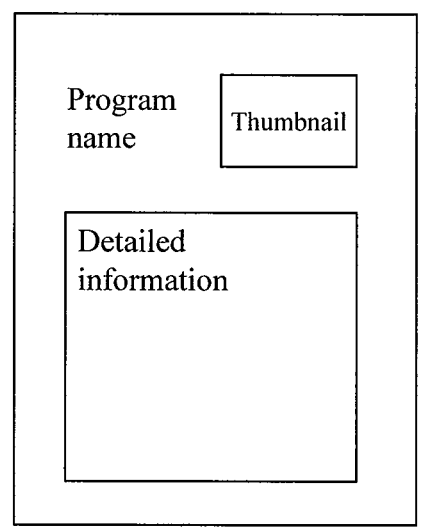

In step 607, the display style determination unit 118 presents information to the display unit 123 in a determined display style. For example, in a case of a display unit of a mobile terminal, one or more interesting scenes transmitted from the display style determination unit 118 are displayed with program names and thumbnails as shown in FIG. 8A and then the user selects one interesting scene from thereamong, thereby displaying detailed information as shown in FIG. 8B. The image on the interesting time is displayed as a thumbnail. The detailed information is, for example, information related to the scene, such as "Performer C_1 recommends Item KW_3" and the like. This detailed information has already been registered in the program information database.

Next, processes of acquiring an item category from the user behavior model in step 604 and of searching for an interesting scene in step 605 will be described.

The user behavior model stores a behavior and a probability of a category wanted by the user at the time as shown in FIG. 9. The user behavior model may be preset by the service provider or automatically generated from the behavior history of the user. More specifically, as shown in the lower part of FIG. 9, the "behavior" in the user behavior model shown in FIG. 9 is defined according to a combination of the location information extracted by the process in step 602 and the keyword extracted by the process in step 603 shown in FIG. 6. For example, a behavior A1 is defined as a "travel" according to a combination of location information outside of the range of livelihood and information of passing a ticket gate of a station. A behavior A2 is defined as "homecoming" according to a combination of information of passing a ticket gate of a station in the range of livelihood and an input of "homecoming" in email text. An input to the mobile terminal determines the behavior of the user, and acquires a category whose probability to be acquired is the highest on the behavior. In the example in FIG. 9, a "costume" category is acquired as a category with the highest probability for the behavior A1. In another example, provided that the location information is acquired in step 602, the user behavior model in FIG. 9 is referred to in step 604, the category with the highest probability is acquired from the models having location information (longitude and latitude) acquired in step 602 or the nearest location as a behavior.

In step 605, the interesting scene is searched for on the basis of the information acquired in step 602 or 603 and the category acquired in step 604. If the location information is acquired in step 602, the location name is acquired from the keyword dictionary using the location information (latitude and longitude), and the interesting scene registration information database is searched for the interesting scene whose keyword is stored in the category acquired in step 604.

Here, in a case where the interesting scene whose keyword is stored in the category with the highest probability has not been registered in the interesting scene registration information database, the search may be performed using the category with the next highest probability. A point of the priority of the interesting scene may be calculated using the probabilities of the entire categories as with an equation (1).

$$Q_S = \sum_i^N w_i C_i \qquad (1)$$

Here, $Q_s$ is a priority of an interesting scene S. i is a category. N is the total number of categories. $w_i$ is the probability of a category i. Since $C_i$ represents whether a keyword of the category i exists in the scene S or not, a binary value, 0 or 1, may be returned.

A several interesting scenes having higher priorities calculated as with the equation (1) may be employed as a search result. The number of items may be set by the service provider. The number of the items may be separately set according to the apparatus displaying the search result. For example, the different numbers of items to be displayed may be set for a case of displaying on the PC and for a case of displaying on the screen of the mobile terminal. In order to consider freshness of the scene, an elapsed time from the registration date may be utilized for calculation of the point of the priority of the scene in equation (1), as with an equation (2).

$$Q_S = \frac{1}{N} \sum_i^N w_i C_i - T_S \qquad (2)$$

$T_s$ is a point according to the elapsed time from the registration date of the scene to the present time. The later the registration date, the nearer the point approaches to 0.

For example, in a case where the user is traveling to Hiroshima, when the user presses the "INTERESTING SCENE PRESENTATION" button after passing a ticket gate of the Hiroshima station, the "Hiroshima station" is acquired as the location name from the location information by means of the GPS, the "travel" is acquired as the behavior, the priority of the interesting scene is calculated according to the equation (1) using the probabilities of the entire categories related to the travel from the user behavior model, and the interesting scene is presented. Description will be made using FIG. 10. It is provided that the probabilities of the categories wanted by the user in a case of the behavior "travel" are set as shown in FIG. 10A. The priority of the scene in FIG. 10B is such that ID_P2 is 60, ID_Q5 is 60 and ID_R3 is 40. Here, this allows the user to acquire information that is related to Hiroshima and was interesting in the past but is forgotten by the user, for example an okonomiyaki parlor recommended by a favorite celebrity, along with an original purpose of the travel, for example, The Atomic Bomb Museum.

If text, "Coming home now.", is transmitted via email, the behavior analyzer is activated with the email transmission and reception as an input, the probabilities of the entire categories related to "homecoming" are acquired on the basis of the keyword "coming" and location information in the range of livelihood using the user behavior model, similar calculation is performed, and the interesting scene is presented. Description will be made using FIGS. 10A and 10B. With the behavior "homecoming", in a case where the priority of each scene in FIG. 10B is calculated using the category probability in FIG. 10A wanted by the user, the priority of ID_Q5 is 35, the priority of ID_S4 is 35, the priority of ID_T1 is 50, the priority of ID_U2 is 35. Here, even though the user usually stops at a bookstore on the way home, presentation of information on a movie interesting in the past allows the user to stop at a rental shop.

A function of changing the probability of the category stored in the user behavior model using a user review of the presented information may be added. For example, the probability of the category is increased or decreased according to whether an operation of viewing the interesting scene displayed on the terminal of the user is performed or not. As to the calculation method, for example, only the probability of the category registered in the selected scene is multiplied by 1.1, and the probabilities of the other categories are evenly decreased so as to maintain the total sum of the probabilities to be a certain value. In FIG. 10, with the behavior "travel", ID_Q5 is viewed, and the probabilities of the categories, "person", "location" and "restaurant", which are registered to the ID_Q5, are multiplied by 1.1. That is, each of the probabilities of "person", "location" and "restaurant" becomes 22. The probabilities of the entire categories are divided by the sum of the entire probabilities, i.e., 1.06 in this case, so as to maintain the total sum of the entire probabilities to be 100, and the probabilities are acquired to their first decimal places. As a result, "person", "location" and "restaurant" becomes 20.7, and "tourist site" becomes 37.7. Here, since the total sum becomes 99.8, the remaining 0.2 is added to what has the highest probability. In this case, because "tourist site" is the highest, "tourist site" is made to be 37.9. The calculation method of increase and decrease is not limited thereto. The method may be what can perform feedback of a user review.

Instead, the probability of the category may repeatedly be estimated using a predefined probability distribution (Gaussian distribution, mixed Gaussian distribution, etc.).

The presented interesting scene may be presented to users other than the user concerned via a network such as the Internet. This scene may be stored in an external storing medium, such as a USB memory and shared with another user. Here, video data of the interesting scene may be shared. It may be configured such that only the scene ID or a thumbnail of the scene is shared.

In this embodiment, all of the scenes interesting the user are registered. A function of automatically deleting the scenes on which a certain time period has elapsed after registration may be added. In this case, the time period to deleting may be preset or set by the user himself/herself.

A case where the above embodiment is extended will hereinafter be described.

[Embodiment 2]

Figure 11:
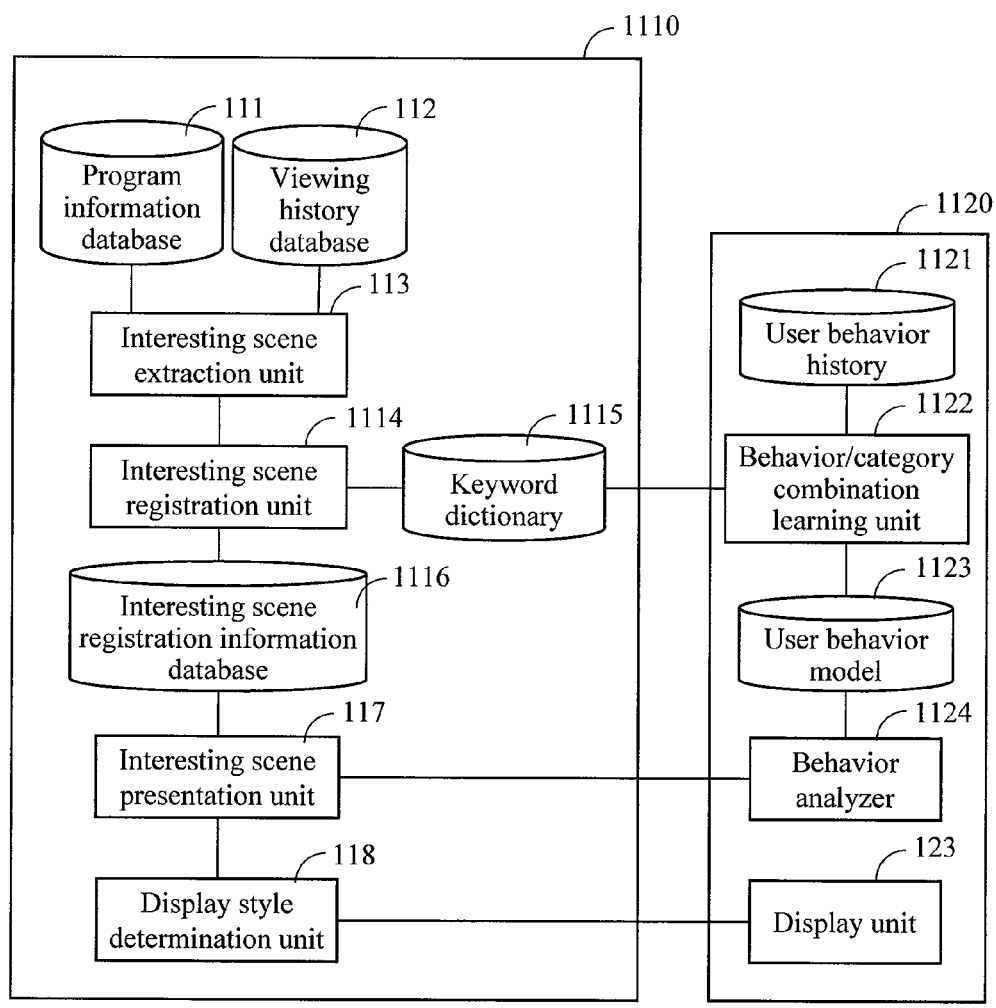
FIG. 11 is a diagram illustrating a configuration where the embodiment shown in FIG. 1 is provided with a user behavior history and a behavior/category combination learning unit.

FIG. 11 is a diagram showing an example of a configuration of an information presentation system including a processor combining the keyword dictionary and the user behavior model. In a case where the category registered in the keyword dictionary 1115 of the terminal 1110 and the behavior registered in the user behavior model 1123 generated on the basis of the user behavior history 1121 of the terminal 1120 are not associated with each other, a behavior/category combination learning unit 1122 performs learning that associates the two with each other. The other configuration is substantially identical to the configuration in FIG. 1 of Embodiment 1.

Figure 12:
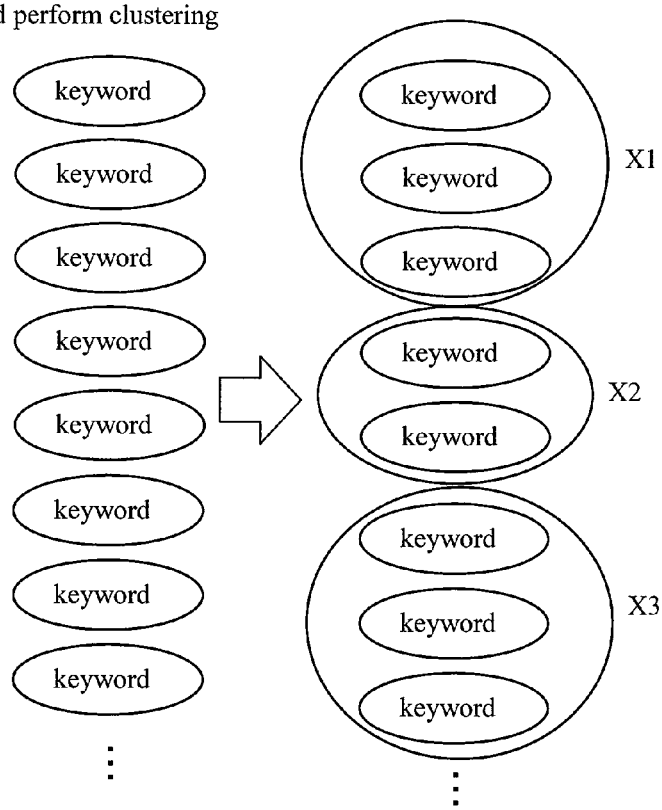
FIG. 12 is a diagram illustrating an example of interesting scene information and a method of clustering keywords included in the interesting scene.

As with Embodiment 1, the interesting scene extraction unit 113 extracts the interesting scene information. The interesting scene registration unit 1114 performs clustering on the keywords included in the interesting scene according to the context, the simultaneous occurrence probability and the like, and performs grouping, as shown in FIG. 12. A degree of similarity defined by the following equation (3) is used for the clustering.

$$d_{ij} = \frac{N_{ij}}{N_i + N_j} \qquad (3)$$

$d_{ij}$ is the degree of similarity between the keywords i and j. $N_{ij}$ is the number of scenes where the keywords i and j concurrently appear. $N_i$ is the number of scenes where the keyword i appears. Because the information is of the interesting scene, there is high possibility that the concurrently appearing keywords differ in meaning from each other. Accordingly, what has a low $d_{ij}$ is regarded similar in meaning, and subjected to the clustering. A pair with low $d_{ij}$ is detected and regarded as a group, and generation thereof is performed. Here, the number of groups may be set. As to the number of groups, the maximum value of the degree of similarity in the group is set as a threshold, and what is less than or equal to the threshold may be regarded as the group.

The thus generated group is registered as the category in the keyword dictionary 1115, as shown in FIG. 13. The interesting scene is registered on the basis of the thus generated keyword dictionary, as shown in FIG. 14.

Next, a process of generating the user behavior model 1123 from the user behavior history 1121 in the behavior/category combination learning unit 1122 will be described in detailed.

Figures 15A, 15B:
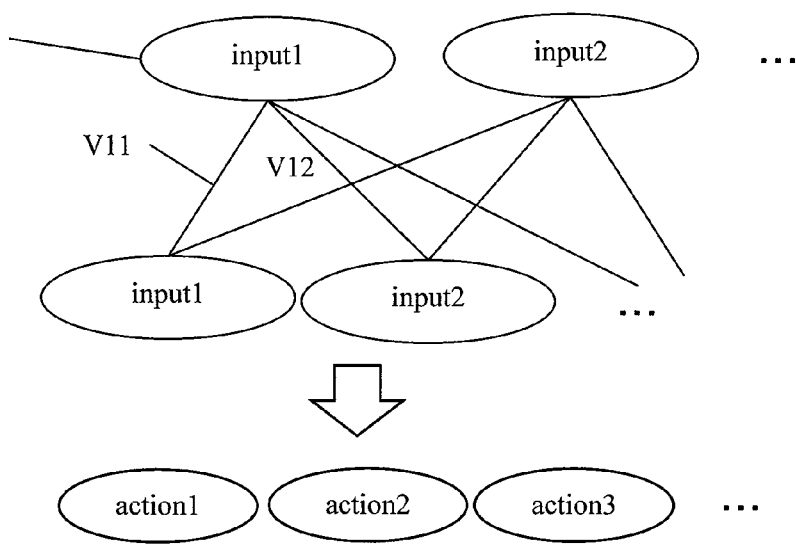
FIGS. 15A and 15B are diagrams illustrating an example of the user behavior history and a method of extracting a behavior attribute from the user behavior history.

FIGS. 15A and 15B show an example of a configuration of the user behavior history 1121 and a method of extracting the behavior. The table of FIG. 15A stores probabilities that inputs (input in the figure) of the location information of the GPS, purchase of an article by electric money, email operation and web browsing are performed concurrently. For example, $V_{12}$ is the probability that input 1 and input 2 are concurrently performed. The probability of concurrent performance is calculated, for example, as with the equation (4).

$$V_{ij} = \frac{D_{ij}}{D_i + D_j} \qquad (4)$$

$V_{ij}$ is the probability that an input i and an input j concurrently occur. $D_{ij}$ is the number of concurrent inputs of the inputs i and j, and $D_i$ is the number of inputs of the input i.

Only combinations where the probabilities are high and the events are easily to occur are extracted from among the concurrent inputs, and registered as the behaviors (action in FIG. 15A). The process may be performed in the background, or accumulated data may periodically be processed.

Next, a method of extracting a behavior from combinations of inputs having concurrently occurred will be described. For example, an input "passed the ticket gate of the station" and location information "Kokubunji station" acquired from the GPS and the like are concurrently held, thereby generating a table of probabilities that the input behaviors in FIG. 15A have concurrently occurred. Provided that an input 1 is "passed the ticket gate" and an input 2 is "Kokubunji station", $V_{12}$ is stored with the probability of concurrent occurrence. Since $V_{ii}$ is one and $V_{ij}=V_{ji}$, only Vij (I≦j) is stored on the memory. Combinations with high probabilities of concurrent occurrence are set as behaviors (action) using this table. Here, a threshold of the probabilities to be set as the behaviors has been preset. The number of inputs concurrently input is not limited to two. Instead, the number may be three or more, or one. In a case of a single input, the input and the behavior have preliminarily been associated with each other in a one-to-one relationship. FIG. 15B is a table of correspondence between the generated behaviors and inputs. Here, "concurrently input" indicates inputs within a predetermined time period. For example, the inputs may be a combination of inputs continuous in time, such that the user passes the ticket gate of the station and then performs a behavior of purchase.

Figures 16A, 16B:
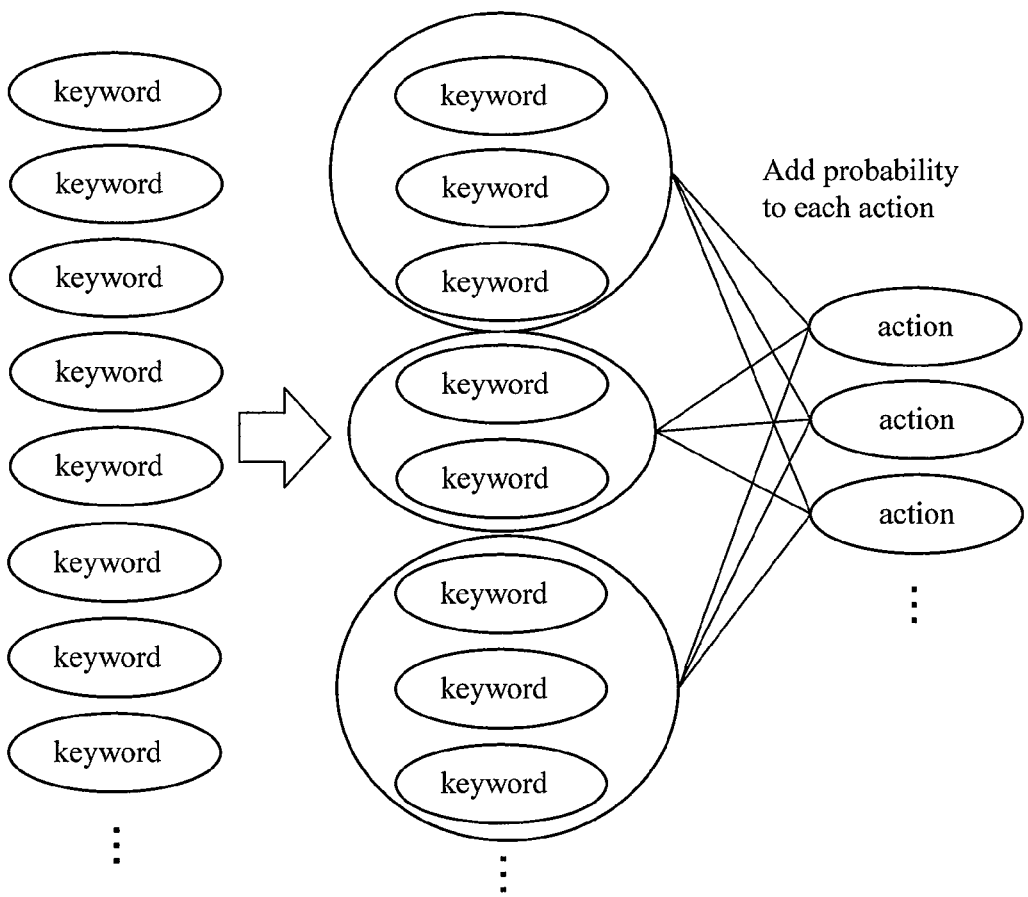
FIGS. 16A and 16B are diagrams illustrating an example of the user behavior model and a method of learning a probability of corresponding a scene attribute and the behavior attribute to each other.

As described above, the generated categories and behavior of the scene are stored in the user behavior model 1123. FIG. 16A is an example of a configuration of the user behavior model 1123. The initial values of the probabilities at the start of system operation may be equal probabilities or be randomly set. As with Embodiment 1, the interesting scene presentation is performed, an evaluation value by the user is fed back, and the probability value connecting the behavior and the scene category is learnt (FIG. 16B).

A method of feedback of the evaluation value will be described. An initial value of the probability value associating the item category generated as shown in FIG. 13 and the behavior generated as shown in FIG. 16 is provided. As with Embodiment 1, the priority of the interesting scene information is calculated using the probability value for the item category registered in the user behavior model, and the interesting scene information of the highest several items is presented. The probability value on the behavior of the item category included in the selected interesting scene information is increased as with an equation (5), using an input of whether the user has selected the presented information or not. The probability value of the item category included in the information that has not been selected is decreased, as with an equation (6).

$$w^*_{ik} = C_+ w_{kj} \qquad (5)$$

$$w^*_{ij} = C_- w_{ij} \qquad (6)$$

Here, $w_{ij}$ is the probability of a category j on a behavior $A_i$. $w^*_{ij}$ is an updated probability, $C_+$ is an increasing rate of the selected category k ($1 < C_+ < 2$), and $C_-$ is a decreasing rate of the category j ($0 < C_- < 1$) having not been selected. Here, it is assumed that the total sum of the probability values is to be maintained at a certain value. Accordingly, a process of maintaining the sum of the probability values at the certain value is performed, as with an equation (7).

$$w^*_{ij} = \frac{w^*_{ij}}{\sum_j^N w^*_{ij}} \qquad (7)$$

Such feedback of the evaluation value is performed, and thereby the probability value suitable for the user is to be registered as shown in FIG. 16A.

In the above description, the scene category and the behavior are not changed after having been generated once. However, update to a new scene category and a new behavior may be performed in consideration with insertion of new program information and complication of operation of the terminal by the user. The clustering process as shown in FIG. 12 is to be periodically performed. The user behavior history as shown in FIG. 15A is periodically recalculated. Further, the generation of a behavior as shown in FIG. 15B is to be periodically performed. Also in this case, the behavior/category combination learning unit 1122 learns the probability value of the item category in the user behavior model, thereby allowing the user to acquire an appropriate interesting scene.

The keyword dictionary and the user behavior model generated as described above are shared with a user other than the user concerned via a network such as the Internet. The interesting scene presentation may be performed using the keyword dictionary and the user behavior model of the other user. Further, those may be shared using an external storing medium such as a USB memory.

[Embodiment 3]

Figure 17:
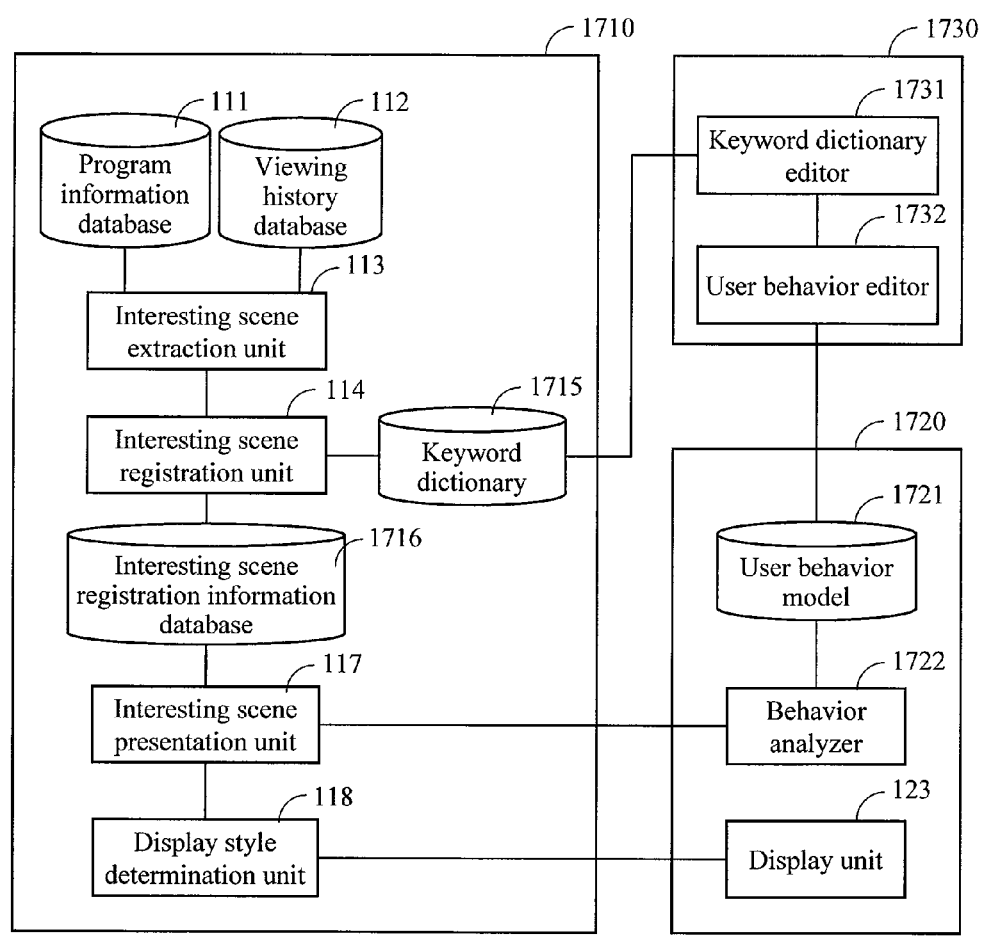
FIG. 17 is a diagram illustrating a configuration where the embodiment shown in FIG. 1 is provided with a keyword dictionary editor and a user behavior editor.

FIG. 17 is a diagram showing an example of a configuration of an information presentation system where a server 1730 manages a keyword dictionary 1715 and a user behavior model 1721.

The server 1730 includes a keyword dictionary editor 1731 and a user behavior editor 1732. The keyword dictionary editor 1731 edits the keyword dictionary 1715. An interesting scene registration information database 1716 of a terminal 1710 of each user is generated according to the edited keyword dictionary 1715. Such editing may be performed by a server administrator or by a plurality of users. The user behavior editor 1732 edits the user behavior model 1721. A behavior analyzer 1722 extracts information on a scene category wanted by the user according to the edited user behavior model 1721. Such editing may also be performed by the server administrator or by the plurality of users. The editing here also indicates addition and deletion of a category. The other configuration is substantially identical to the configuration in FIG. 1 of Embodiment 1.

The editing of keyword dictionary and the user behavior in the server 1730 will be described. The user can always connect to the server 1730 via the Internet, and arbitrarily set the user behavior in the user behavior model 1721 and the category of the keyword. In this case, the user behavior is to have been provided as a combination between "purchase behavior", "email operation" or "web browsing" and location information such as a location name. The entire keywords are to have been extracted from the interesting scene information database.

For example, as shown in FIG. 18A, in the user behavior, the concurrent input, "web browsing" and "Kokubunji station", is set as a behavior "killing time". The category of the keyword is regarded as "amusement", and the category probability is arbitrarily set to the keyword (FIG. 18B). The user downloads the edited user behavior model from the server via the Internet, and can thereby acquire new interesting scene information on an actual behavior.

What has been edited in a community site by a plurality of users in the Internet may be downloaded. The user behavior model edited by the other users is shared, and thereby a new combination of the behavior and the keyword category can be discovered.

The keyword dictionary edited in the server 1730 may be downloaded to the terminal 1710, and recorded and stored in the external storing apparatus.

Figure 19:
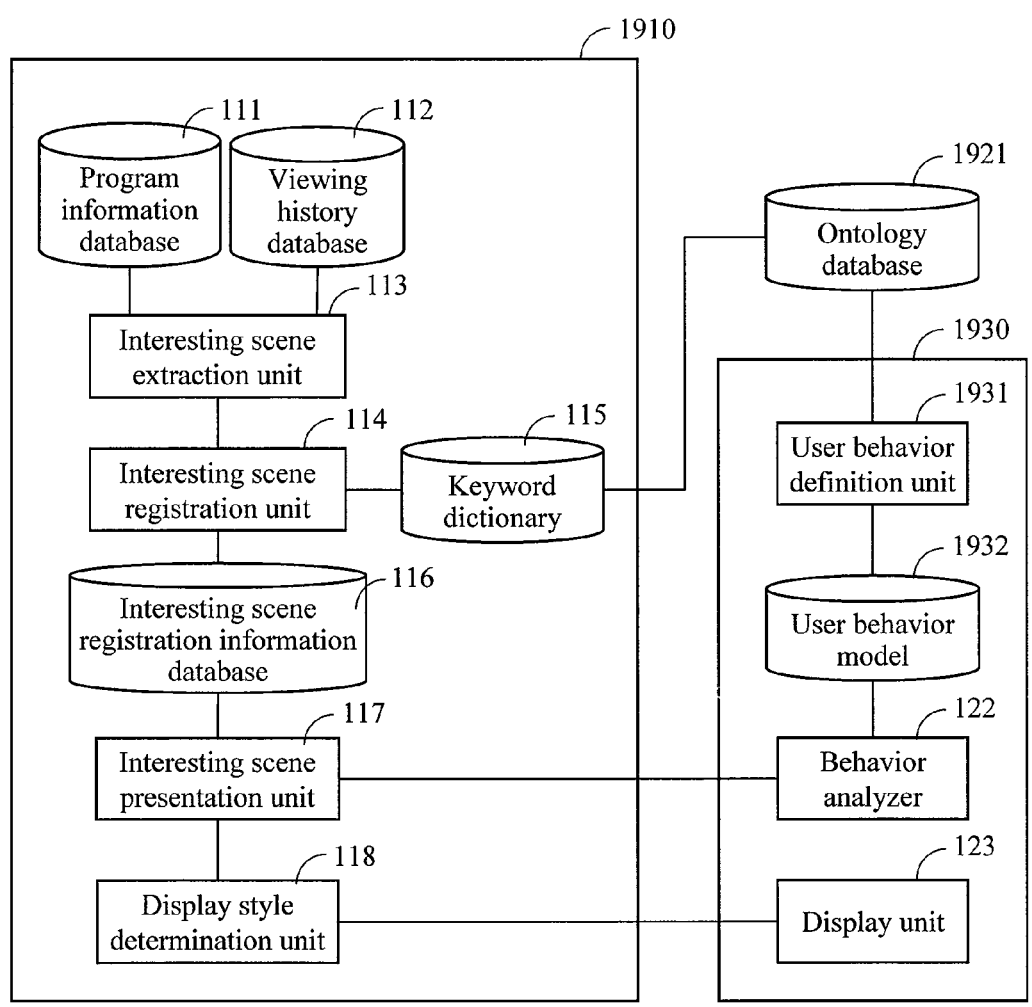
FIG. 19 is a diagram illustrating a configuration where the embodiment shown in FIG. 1 is provided with an ontology database and a user behavior definition unit.

FIG. 19 is a diagram showing a configuration of the information presentation system to which an ontology database 1921 and a user behavior definition unit 1931 are added.

The ontology database 1921 is a database where semantic association of categories is registered. FIG. 20 shows an example of a configuration thereof. Semantic superior/inferior relationship is registered in the keyword and the scene category, and semantic association between the scene category and the behavior is also registered. On the basis thereof, the user behavior definition unit 1931 generates the user behavior model 1932. The other configuration is substantially identical to the configuration of FIG. 1 of Embodiment 1.

The initial values of the probability values of the behaviors of the user behavior model and the categories wanted by user are set such that the total sum of the categories related to the behavior is 100, using the ontology database. For example, provided that categories X1 and X2 are defined for a behavior A1, the initial value of each category is set to 50. The learning of the probability value as described above is then performed, and user behavior model optimal to the user is learnt.

The invention of the present application may be applied to, for example, home video apparatuses such as DVD recorders and TVs, personal computers with a TV function, information apparatuses such as PDAs and mobile phones, set-top boxes for playing back network-distributed programs and the like.

DESCRIPTION OF SYMBOLS

110 terminal
111 program information database
112 viewing history database
113 interesting scene extraction unit
114 interesting scene registration unit
115 keyword dictionary
116 interesting scene registration information database
117 interesting scene presentation unit
118 display style determination unit
120 terminal
121 user behavior model
122 behavior analyzer
123 display unit

What is claimed is:

1. An information presentation apparatus, comprising:
a program information database accumulating program information;
a viewing history database accumulating a program viewing history of a user;
a dictionary recording correspondence between a keyword and a category;
an interesting scene extraction unit extracting a scene of a program that interests the user using the viewing history database and the program information database;
an interesting scene registration unit that associates the interesting scene extracted by the interesting scene extraction unit and the keyword in the program information accompanying the interesting scene, and registers the keyword associating the interesting scene in an interesting scene registration information database according to the dictionary on a category-by-category basis; and
an interesting scene presentation unit searching the interesting scene registration information database and retrieving and presenting the interesting scene matching with the input category, responsive to an input of information including the category from a mobile terminal,
wherein the interesting scene presentation unit receives an input of information related to a plurality of categories and probabilities for the respective categories, and calculates a score of the interesting scene registered by the interesting scene registration unit.

2. The information presentation apparatus according to claim 1, further comprising an information display style determination unit converting an information display style, wherein the information display style determination unit converts the display style of the interesting scene retrieved by the interesting scene presentation unit according to the type of the mobile terminal and transmits the converted display style to the mobile terminal.

3. The information presentation apparatus according to claim 1, wherein the interesting scene registration information database is registered with the registration date of the interesting scene, and the interesting scene presentation unit performs calculation for increasing the priority of the interesting scene with a recent registration date.

4. The information presentation apparatus according to claim 1, wherein the interesting scene registration information database is registered with the registration date of the interesting scene, and the interesting scene registration unit deletes information of the interesting scene when a certain time period has elapsed after the registration.

5. The information presentation apparatus according to claim 1, wherein the dictionary is also stored with correspondence between the name of a location and its coordinates.

6. The information presentation apparatus according to claim 1, wherein the dictionary is shared among a plurality of users in a virtual space such as the Internet.

7. The information presentation apparatus according to claim 1, wherein the dictionary is recorded in an external storing apparatus and shared by a plurality of users.

8. The information presentation apparatus according to claim 1, wherein the keywords included in the interesting scene extracted by the interesting scene extraction unit are clustered into a plurality of clusters, and each of the clusters is registered as the category, thereby creating the dictionary.

9. A mobile terminal used together with the information presentation apparatus according to claim 1, comprising:
a user behavior model storing an input and probabilities for the respective categories corresponding to the input;
a behavior analyzer that acquires probabilities for the respective categories corresponding to the latest input from the user behavior model, and transmits the probabilities to the information presentation apparatus; and
a display unit displaying the interesting scene transmitted from the information presentation apparatus,
wherein the probability of the category common with the category registered in the interesting scene among the probabilities of the category corresponding to the latest input is increased, and the probabilities of the other categories are decreased, when the interesting scene displayed on the display unit has been viewed.

10. The mobile terminal according to claim 9, wherein the user behavior model is shared among a plurality of users in a virtual space such as the Internet.

11. The mobile terminal according to claim 9, wherein the user behavior model is recorded in an external storing apparatus and shared by a plurality of users.

12. The mobile terminal according to claim 9, wherein the dictionary is created by clustering the keywords included in the interesting scene extracted by the interesting scene extraction unit into a plurality of clusters and registering each cluster as the category, and the terminal further comprising a behavior/category combination learning unit performing learning for optimizing a combination of the dictionary and the user behavior model.

13. The mobile terminal according to claim 12, wherein the behavior/category combination learning unit extracts a characteristic behavior from an operation history of the user.

14. The mobile terminal according to claim 13, wherein the behavior/category combination learning unit learns the probability value of each category corresponding to the characteristic behavior using a user review.

* * * * *